United States Patent
Jeon

(10) Patent No.: US 10,615,974 B2
(45) Date of Patent: *Apr. 7, 2020

(54) SECURITY AUTHENTICATION SYSTEM FOR GENERATING SECURE KEY BY COMBINING MULTI-USER AUTHENTICATION ELEMENTS AND SECURITY AUTHENTICATION METHOD THEREFOR

(71) Applicant: FNS Value Co., Ltd., Seoul (KR)

(72) Inventor: Seung Ju Jeon, Paju-si (KR)

(73) Assignee: FNS Value Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/677,322

(22) Filed: Nov. 7, 2019

(65) Prior Publication Data

US 2020/0076588 A1    Mar. 5, 2020

Related U.S. Application Data

(63) Continuation of application No. PCT/KR2018/005795, filed on May 21, 2018.

(30) Foreign Application Priority Data

May 22, 2017    (KR) .................. 10-2017-0062912

(51) Int. Cl.
| | | |
|---|---|---|
| *H04L 9/00* | (2006.01) | |
| *H04L 9/08* | (2006.01) | |
| *H04L 29/06* | (2006.01) | |
| *G06F 21/40* | (2013.01) | |
| *H04W 12/00* | (2009.01) | |

(52) U.S. Cl.
CPC ............ *H04L 9/0866* (2013.01); *G06F 21/40* (2013.01); *H04L 9/0894* (2013.01);
(Continued)

(58) Field of Classification Search
None
See application file for complete search history.

(56) References Cited

U.S. PATENT DOCUMENTS

| | | | | |
|---|---|---|---|---|
| 8,769,627 B1* | 7/2014 | Guo | .................... | G06F 11/1453 |
| | | | | 726/4 |
| 8,984,607 B1* | 3/2015 | Hughes | ................... | G06F 21/31 |
| | | | | 726/7 |

(Continued)

FOREIGN PATENT DOCUMENTS

| | | |
|---|---|---|
| KR | 10-0757982 B1 | 9/2007 |
| KR | 10-2013-0140968 A | 12/2013 |

(Continued)

OTHER PUBLICATIONS

International Search Report issued in PCT/KR2018/005795; dated Aug. 28, 2018.

*Primary Examiner* — Beemnet W Dada
(74) *Attorney, Agent, or Firm* — Studebaker & Brackett PC

(57) ABSTRACT

The present invention relates to a security authentication system for generating a secure key by combining authentication elements of multi-users and a security authentication method thereof, and more particularly, to a security authentication system for generating a secure key by combining authentication elements of multi-users and a security authentication method so as to collect information from multi-users in a smart terminal-based security authentication environment and generate a secure key by combining the collected information of multi-users as authentication elements. According to the present invention, by applying identification information automatically collected by a smart terminal as authentication elements and generating a secure key by cross-combining the authentication elements, it is possible to provide a security service reinforced by multilateral (Continued)

cooperation, so that the provided security service is coupled with existing authentication and encryption technology to be applied to various applications.

6 Claims, 5 Drawing Sheets

(52) U.S. Cl.
CPC .......... *H04L 63/068* (2013.01); *H04L 63/083* (2013.01); *H04L 63/0853* (2013.01); *H04L 63/0876* (2013.01); *H04W 12/00407* (2019.01); *H04W 12/00503* (2019.01)

(56) References Cited

U.S. PATENT DOCUMENTS

| | | | | |
|---|---|---|---|---|
| 2011/0202767 A1* | 8/2011 | Hui | ........................ | H04L 9/321 713/168 |
| 2011/0213985 A1* | 9/2011 | Miller | ..................... | G06F 21/35 713/185 |
| 2011/0277021 A1* | 11/2011 | Ogawa | ..................... | G06F 21/36 726/6 |
| 2012/0054833 A1* | 3/2012 | Albisu | ..................... | G06F 21/36 726/4 |
| 2014/0334622 A1* | 11/2014 | Smyth | ..................... | H04L 9/008 380/28 |
| 2015/0341327 A1* | 11/2015 | Barton | .................. | H04L 63/083 713/168 |
| 2018/0191697 A1* | 7/2018 | Ghafourifar | ............ | H04L 63/08 |

FOREIGN PATENT DOCUMENTS

| | | |
|---|---|---|
| KR | 10-1450013 B1 | 10/2014 |
| KR | 10-2015-0006402 A | 1/2015 |
| KR | 10-2015-0050130 A | 5/2015 |
| KR | 10-2016-0150097 A | 12/2016 |
| KR | 10-2017-0022857 A | 3/2017 |

* cited by examiner

Security authentication system

| Classification | Contents |
|---|---|
| Area detection information | RFID tag, WIFI SSID, beacon, sensor value |
| Knowledge-based information | Email address, ID, and password |
| Device information | Sensor, UUID, status information, MAC address |
| Possession information | Phone number, NFC tag, QR code, barcode |

SECURITY AUTHENTICATION SYSTEM FOR GENERATING SECURE KEY BY COMBINING MULTI-USER AUTHENTICATION ELEMENTS AND SECURITY AUTHENTICATION METHOD THEREFOR

CROSS-REFERENCE TO RELATED APPLICATIONS

The present application is a continuation of International Patent Application No. PCT/KR2018/005795, filed May 21, 2018, which is based upon and claims the benefit of priority to Korean Patent Application No. 10-2017-0062912, filed on May 22, 2017. The disclosures of the above-listed applications are hereby incorporated by reference herein in their entirety.

TECHNICAL FIELD

The present invention relates to a security authentication system for generating a secure key by combining authentication elements of multi-users and a security authentication method thereof, and more particularly, to a security authentication system for generating a secure key by combining authentication elements of multi-users and a security authentication method so as to collect information from multi-users in a smart terminal-based security authentication environment and generate a secure key by combining the collected information of multi-users as authentication elements.

BACKGROUND ART

With the development of information and communication technology, as information is centralized online, the importance of information protection and security is more increasing. The information protection is a technology for safely protecting computers and information on the organization or individuals from various illegal activities including forgery, leakage, trespass, and denial of service on information transmitted via an information system using a computer or a network such as wired or wireless Internet, preventing security breaching accidents in a physical space, and providing security at a convergence system with other industries. The information protection is classified into common-based security, network security, device security, service security, and convergence security technologies.

Traditionally, the security has been grown separately by physical security and information security, but recently, while a physical security industry, such as access control, parking management, CCTV video surveillance, is combined with an IT information security technology to protect a computer and information on the network, a boundary between the physical security and the information security has collapsed and convergence security area combined with areas of the physical security and the information security occurs. In addition, while the IT technology is applied to existing industries such as automotive, shipbuilding, medical, and power generation, handling the security problems occurring in the convergence between IT and industry is included in new convergence security.

Encryption and authentication refer to a technology for encrypting data stored in a computer system and a communication period to secure confidentiality and certifying a user to access the system. As the common-based security technology, coverage may include web security, DB security, XML security, network security, smartphone security, and the like encrypting transmission and reception between a web server and a browser, public key infrastructure (PKI) such as encryption, authentication, and electronic signature, etc.

In conjunction with a user authentication technology, there is a need for a process of certifying whether a user receiving a service is an appropriate user due to a non-face-to-face characteristic of online services. If the user may not be properly certified, personal information and the like may be exposed according to a type of service, and thus it is required to secure safety and reliability through user authentication. As such, elements used to determine whether a user receiving the service is legal refer to as authentication elements.

There is disclosed a technology for generating a secure key from authentication elements unique to a specific device and a specific user in a security system for confirming the user in a service providing process.

FIG. 1 is a block view illustrating a configuration of a secure key generating device in the related art.

A secure key generating device 10 of the related art is connected to a storage 20 to generate a secure key by using authentication information for authenticating a media ID and a user 1 as unique identifiers.

The secure key generating device 10 is connected to the storage 20 and receives a primitive ID from the storage 20. The primitive ID is at least one data for identifying used for operation of a media ID as the unique identifier of the storage 20 and data different from the media ID. The secure key generating device 10 generates the media ID from the primitive ID. In other words, the secure key generating device 10 receives the primitive ID as source data capable of generating the media ID without receiving directly the media ID from the storage 20. This is intended to prevent the media ID from being exposed, and the secure key generating device 10 may store data used to generate the media ID from the primitive ID.

The secure key generating device 10 may include an ID calculating unit 12, an authentication information providing unit 14, and a secure key generating unit 16. The ID calculating unit 12 calculates a media ID as a unique identifier of the storage 20 from the primitive ID by receiving the primitive ID stored in the storage 20.

However, in order to generate the secure key in the same manner, authentication information that is based on unique information of the user needs to be used. Since a common secure key generation algorithm is used to generate the secure key, there is a risk that the secure key may be exposed if the authentication information is exposed.

DISCLOSURE

Technical Problem

In order to solve the aforementioned problems, an object of the present invention is to provide a security authentication system and a security authentication method for generating a secure key by combining authentication elements of multi-users by automatically collecting authentication elements from a plurality of user terminals without user's intervention and generating a secure key by multi-dimensionally cross-combining the collected authentication elements of the plurality of user terminals to enhance security.

Another object of the present invention is to provide a security authentication system and a security authentication method which may generate a secure key by combining authentication elements of multi-users by collecting information about a surrounding area such as a sensor value, an RFID tag, an NFC tag, and WIFI SSID in addition to information that may be collected from the user terminal, such as a phone number or ID, an E-mail address, etc. of the user and using the information as authentication elements to prevent exposure or hacking of the secure key.

Yet another object of the present invention is to provide a security authentication system nd a security authentication method which may generate a secure key by combining authentication elements of multi-users by generating and using a single-use secure key or using a secure key to be deleted after a predetermined time to further enhance the security.

Technical Solution

In order to solve the aforementioned problems, an embodiment of the present invention provides a security authentication system 100 which collects authentication elements from a plurality of smart terminals by a request of a first user terminal 30 to generate a secure key, the system including: a control unit 102 configured to control operations of configurations; a collecting unit 104 configured to collect authentication elements from the first user terminal 30 and a second user terminal 40 automatically or manually according to a user's selection to store the collected authentication elements in an authentication element DB 116; and a combining unit 106 configured to generate a secure key by multiple cross-combination of the authentication elements collected from the first user terminal 30 and the second user terminal 40 to store the generated secure key in a secure key DB 118, in which the combining unit 106 randomly extracts and combines the plurality of authentication elements collected from the plurality of user terminals 30 and 40 and generates a secure key using an encryption algorithm.

The authentication elements may include area detection information including information on an RFID tag, a WIFI SSID, a beacon, and a sensor value; knowledge-based information including an email address, an ID, and a password of a user; device information including a sensor, a universal unique identifier (UUID), status information, an MAC address or the like; and possession information including a phone number, an NFC tag, a QR code, and a barcode.

The secure key may be one of a single-use secure key to be deleted or discarded after used for security authentication and a period-limited secure key to be deleted or discarded after a predetermined period.

Another embodiment of the present invention provides a security authentication method using the security authentication system 100, the method including: a first step of requesting, by a user, any one service of contents or information, financial services, and access authentication by accessing a service system 50 through a first user terminal 30 and requesting, by the first user terminal 30, a secure key for security authentication by accessing the security authentication system 100; a second step of requesting, by a collecting unit 104 included in the security authentication system 100, provision of authentication elements to the first user terminal 30 used by the user and a second user terminal 40 used by the other user; a third step of storing, by the collecting unit 104, a plurality of authentication elements provided from the first user terminal 30 and the second user terminal 40 in a authentication element DB 116; and a fourth step of generating, by a combining unit 106 included in the security authentication system 100, a secure key by multi-dimensionally cross-combining the plurality of authentication elements and providing the generated secure key to the first user terminal 30.

The authentication elements may include area detection information including information on an RFID tag, a WIFI SSID, a beacon, and a sensor value; knowledge-based information including an email address, an ID, and a password of a user; device information including a sensor, a universal unique identifier (UUID), status information, an MAC address or the like; and possession information including a phone number, an NFC tag, a QR code, and a barcode.

The secure key may be one of a single-use secure key to be deleted or discarded after used for security authentication and a period-limited secure key to be deleted or discarded after a predetermined period.

Advantageous Effects

According to the present invention, by applying identification information automatically collected by a smart terminal as authentication elements and generating a secure key by cross-combining the authentication elements, it is possible to provide a security service reinforced by multi-lateral cooperation, so that the provided security service is coupled with existing authentication and encryption technology to be applied to various applications.

Further, for various convergence services, results occurring when devices embedded in the smart terminal interoperate with neighboring sensors are used as authentication elements to improve security and be applied to fields such as access control with neighboring sensors in a converged network environment.

Figure 1:
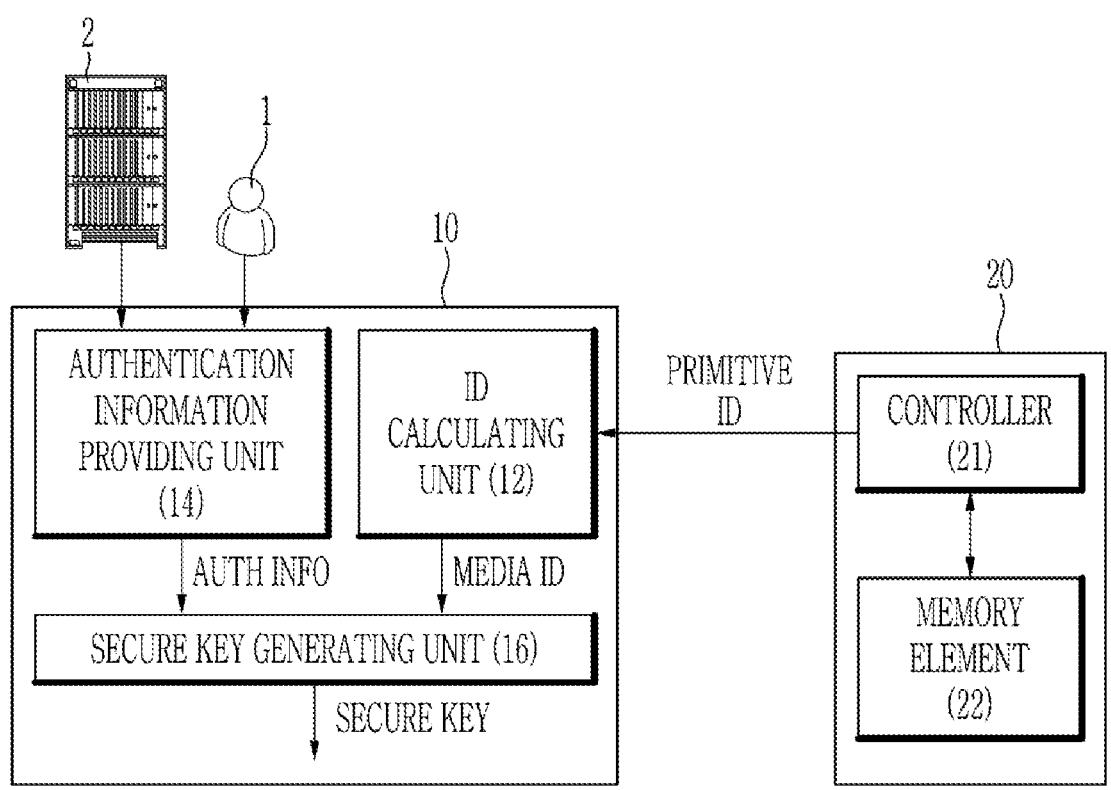
FIG. 1 is a block view illustrating a configuration of a secure key generating device in the related art.

[Description of Main Reference Numerals of Drawings]

| | |
|---|---|
| 30: First user terminal | 40: Second user terminal |
| 50: Service system | 100: Security authentication system |
| 102: Control unit | 104: Collecting unit |
| 106: Combining unit | 108: Encrypting unit |
| 110: Decrypting unit | 112: Authority managing unit |
| 114: User DB | 116: Authentication element DB |
| 118: Secure key DB | |

BEST MODE

Hereinafter, "a system for security authentication and a method for security authentication capable of generating a secure key by combining authentication elements of multi-users" according to an embodiment of the present invention will be described with reference to the accompanying drawings.

Figure 2:
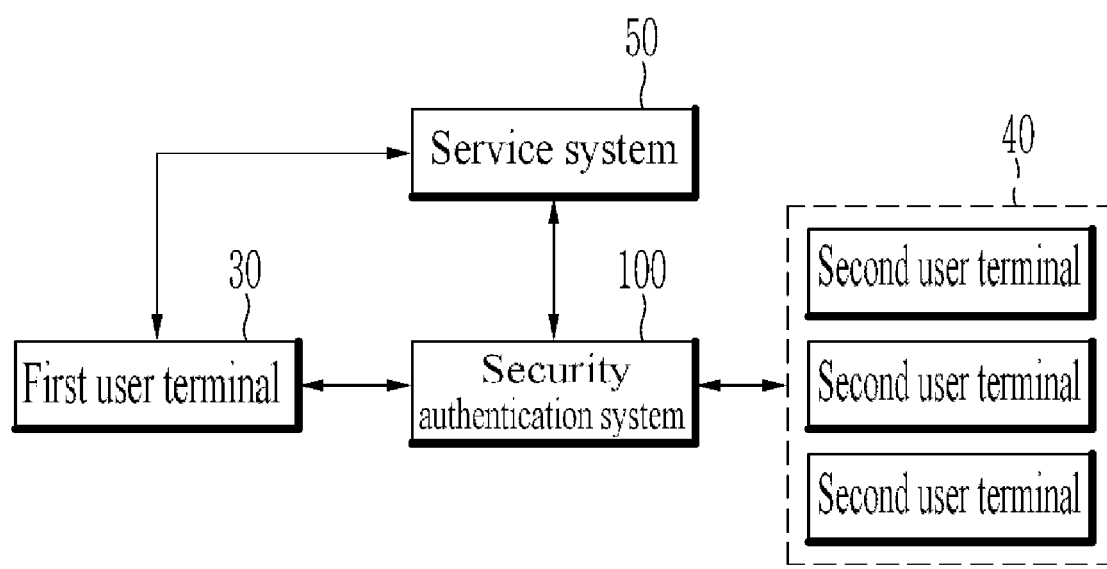
FIG. 2 is a block view illustrating a connection state of a system for security authentication according to an embodiment of the present invention.
Figure 3:
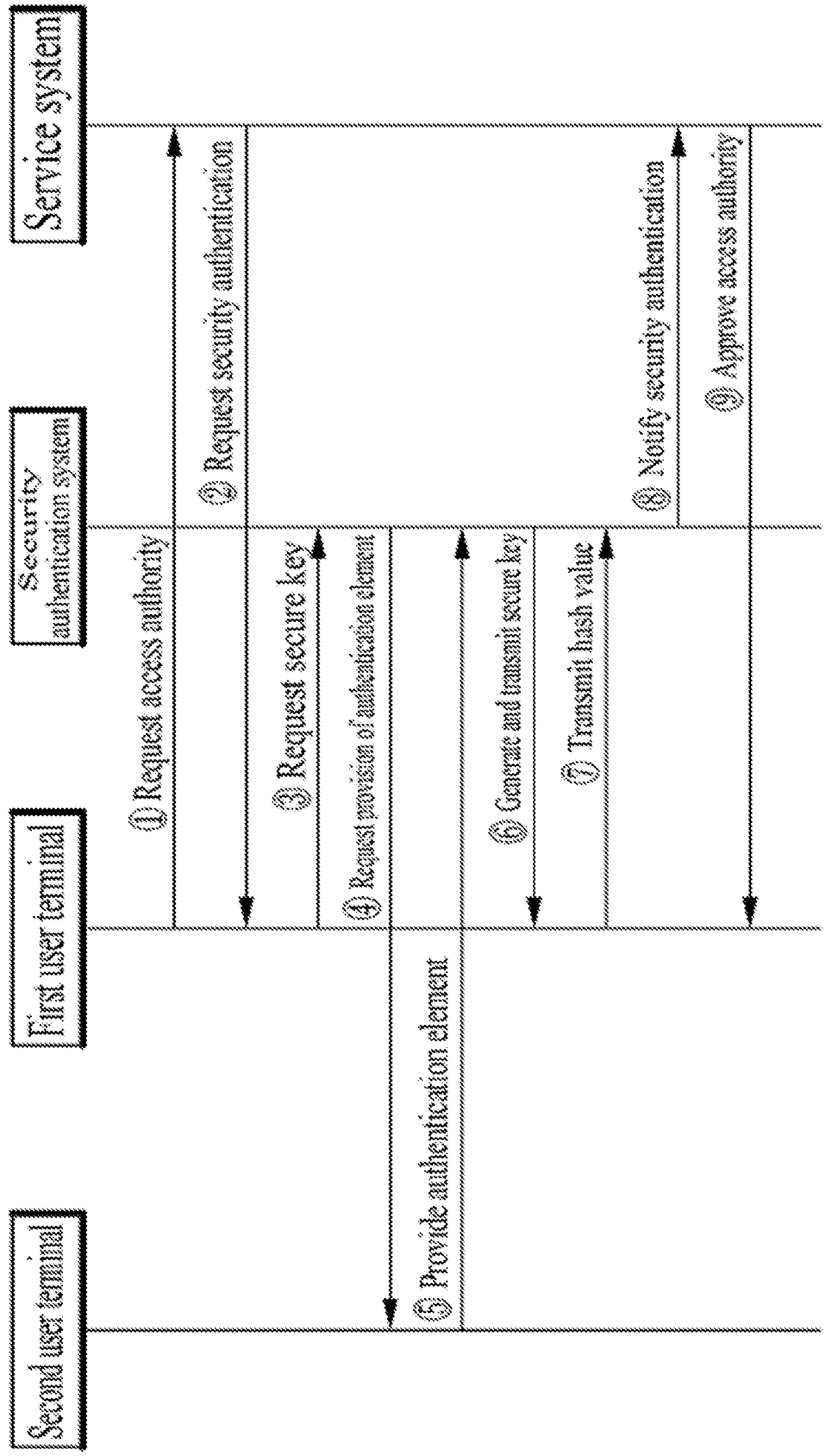
FIG. 3 is a schematic view illustrating a data flow between the system for security authentication and other configurations.

FIG. 2 is a block view illustrating a connection state of a system for security authentication according to an embodiment of the present invention and FIG. 3 is a schematic view illustrating a data flow between the system for security authentication and other configurations.

First, "a system for security authentication generating a secure key by combining multi-user authentication elements" of the present invention (hereinafter, referred to as a 'security authentication system') will be described and then a method for security authentication performed using a security authentication system 100 will be described.

The security authentication system 100 of the present invention is used for verifying the identity of a user accessing a computer system for work to accept access authority for the system. In addition, the security authentication system 100 is used for services of blocking an access to prevent the leakage of contents, information, and documents, verifying the identity non-face-to-face in a financial service, and requiring security authentication of the user to manage an access to restricted areas. The user may perform proper user authentication by a security authentication procedure provided by the security authentication system 100.

The user accesses the security authentication system 100 using a smart terminal such as a smartphone or a tablet PC and performs a user authentication procedure using a security authentication service or a secure key provided by the security authentication system 100.

In the present invention, a terminal of the user which requests the security authentication service for the user authentication procedure is referred to as a first user terminal 30 and the terminal of the other user which collects authentication elements to generate a secure key to be used in the first user terminal 30 is referred to as a second user terminal 40. That is, among a plurality of terminals accessing the security authentication system 100, the side requesting the security authentication service becomes the first user terminal 30 and the other side becomes the second user terminal 40. The security authentication system 100 collects authentication elements from the first user terminal 30 and the second user terminal 40.

The service system 50 is a system which provides an interface or data required for an operation to the user and provides various types of information or contents, financial services, and the like, and provides a service to only a user whoes identity is verified through user authentication. It is generally limited to access only a user receiving access authority, such as a company's intranet system accessed by staffs for work processing. To this end, an authentication procedure of the security authentication system 100 is required, and then the secure key generated and transmitted by the security authentication system 100 is used. In order to access the service system 50 by receiving the secure key generated by the security authentication system 100, the user needs to be registered in the security authentication system 100 and the service system 50 and user information of the user having access authority is stored in the security authentication system 100 and the service system 50.

As illustrated in FIG. 3, the user requests access authority to use work process approval or services such as contents, information, financial services, and access authentication by accessing the service system 50 through the first user terminal 30 (①).

The service system 50 requests security authentication to the first user terminal 30 in order to authenticate the user requesting the access authority (②).

The user requests a secure key for security authentication by accessing the security authentication system 100 through the first user terminal 30 (③).

The security authentication system 100 requests provision of authentication elements to the second user terminal 40 of the other user as well as the first user terminal 30 for generation of the secure key (⑤). When the user agrees to provide the authentication elements, the first user terminal 30 and the second user terminal 40 provide the security authentication system 100 with authentication elements including various information to be used for the generation of the secure key (⑤). Generally, without collecting the authentication elements whenever the security authentication is requested, the authentication elements are automatically collected and stored from all user terminals agreeing to provide the authentication elements of the security authentication system 100.

The security authentication system 100 generates a secure key by cross-combining the collected authentication elements multi-dimensionally and provides the generated secure key to the first user terminal 30 (⑥).

The first user terminal 30 converts the secure key transmitted from the security authentication system 100 into a hash value using a separate algorithm. In addition, the first user terminal 30 transmits the generated hash value to the security authentication system 100 (⑦).

The security authentication system 100 verifies whether the transmitted hash value is equal to a hash value of a secure key generated normally. To this end, the security authentication system 100 converts the secure key into a hash value using the same algorithm as the first user terminal 30. In some case, before or after transmitting the secure key to the first user terminal 30, the security authentication system 100 generates and pre-stores a hash value for the corresponding secure key and calls the stored hash value when the hash value is transmitted from the first user terminal 30 to compare the hash values with each other.

When the hash values are compared to be verified as the same secure key, the security authentication system 100 notifies to the service system 50 that the security authentication is normally processed (⑧).

The service system 50 receiving the notification for accepting the security authentication notifies to the first user terminal 30 that the access authority is approved and the user may perform a normal work by accessing the service system 50 (⑨).

When the user authentication is completed, the service system 50 normally provides a predetermined service to the first user terminal 30 or the user.

The secure key provided to the first user terminal 30 is temporarily stored and set to be deleted when the secure key is used for security authentication or a use date expires. The first user terminal 30 transmits a deleted state value to the security authentication system 100 when the secure key is deleted to allow the security authentication system 100 to recognize the deletion.

Figure 4:
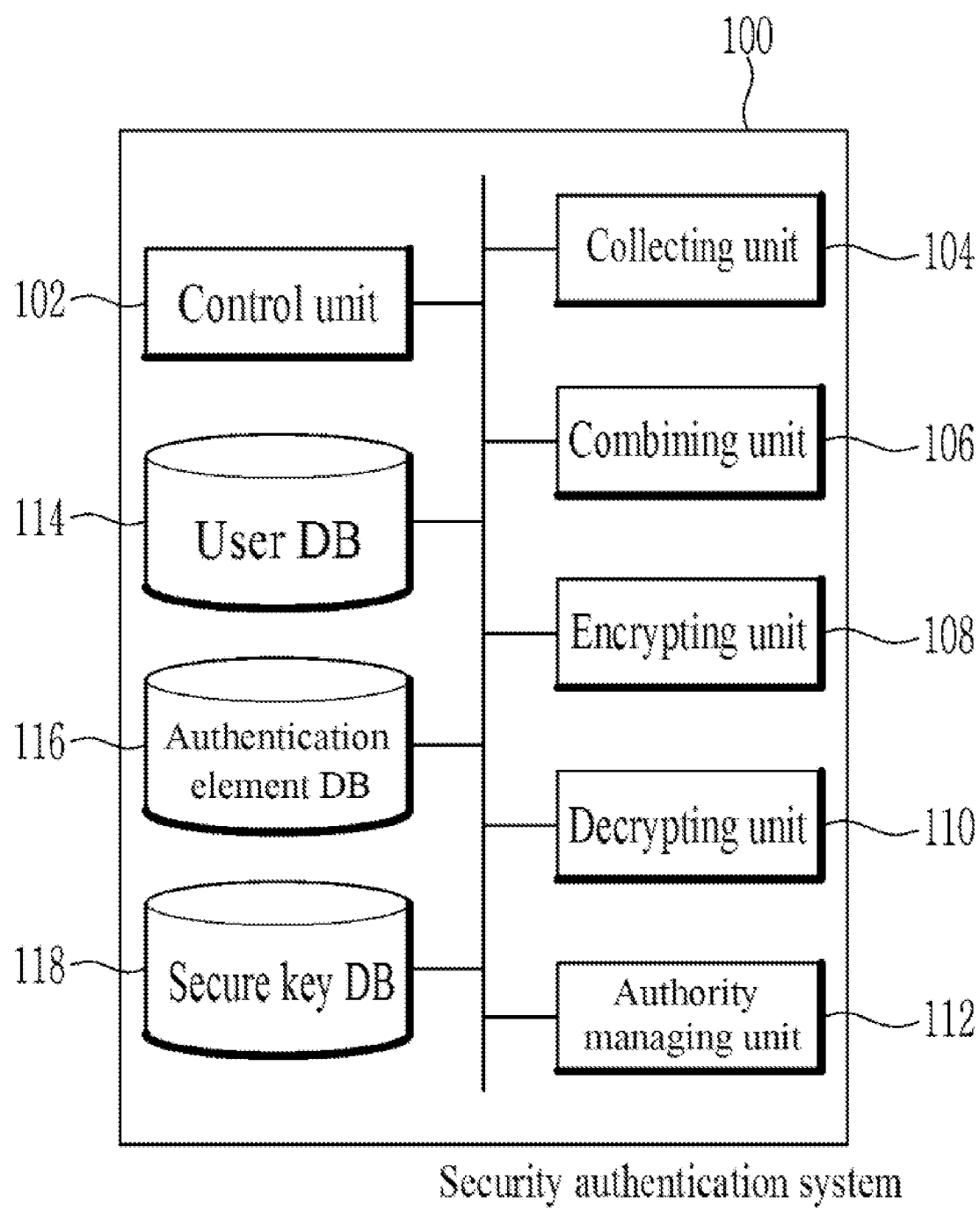
FIG. 4 is a block view illustrating internal configurations of the system for security authentication.

FIG. 4 is a block view illustrating internal configurations of the system for security authentication.

A control unit 102 included in the security authentication system 100 controls operations of the internal configurations and executes operations such as data conversion and storage between the configurations.

A collecting unit 104 collects various authentication elements which may be collected from the user terminals 30 and 40 such as smart terminals automatically or manually according to the user's selection. Specific data collected by the collecting unit 104 and used for the generation of the secure key are defined as authentication elements.

Figures 5, 6:
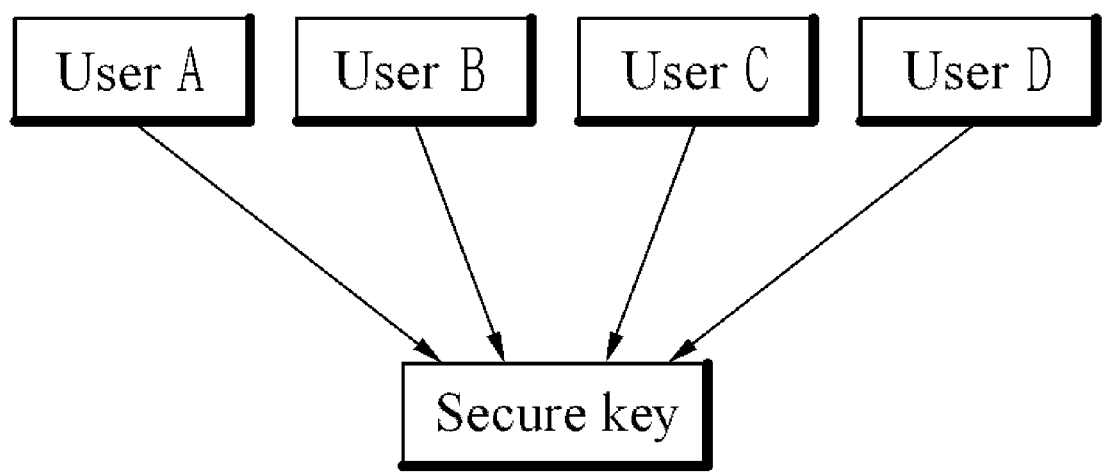
FIG. 5 is a table illustrating types and detailed contents of authentication elements.
FIG. 6 is a block view illustrating a combining method for generating a secure key.

FIG. 5 is a table illustrating types and detailed contents of authentication elements.

In the present invention, authentication elements to be used for generation of the secure key include area detection information, knowledge-based information, device information, and possession information.

The area detection information includes information, such as RFID tags and WIFI SSID, beacon, and sensor values (a proximity sensor, an illumination sensor, a vibration sensor).

The knowledge-based information is information set and stored based on knowledge of the user and includes an email address, an ID, a password, and the like of the user. The ID may be an Android ID.

The device information includes sensors, universal unique identifiers (UUIDs), status information, an MAC address or the like. The status information includes a volume, a vibration/bell state, and the like as various kinds of information for checking a current status of the smart device.

The possession information includes a phone number, an NFC tag, a QR code, a barcode, and the like which are defined when the user uses the terminal.

Since authentication elements which may be collected by various smart terminals vary for each type of smart terminal, information is correctly determined and authentication element information needs to be collected within a short time. To this end, it is preferable to divide authentication elements to be collected according to a characteristic and apply an algorithm to collect information in a multiple thread method.

In the present invention, a type of authentication element used to generate the secure key is set by a managing unit constituting the security authentication system 100. The managing unit may provide additional services by collecting appropriate types of authentication elements according to the characteristics of the service system 50.

In some cases, in a process of registering as a user, the user may select and designate the authentication elements.

The collecting unit 104 operates as a background service on a smart terminal and collects authentication elements when a mobile application required for user authentication is called to share information with the corresponding application. The authentication elements collected by the collecting unit 104 are stored in an authentication element DB 116.

A combining unit 106 generates a secure key to be used for encryption and decryption through multiple cross-combination using the collected multiple authentication elements. The combining unit 106 may randomly extract a plurality of authentication elements collected from the plurality of user terminals 30 and 40 and generate various kinds of secure keys through cross-combination. In some cases, two or more secure keys to be used in one of the user terminals 30 and 40 may be generated.

A user DB 114 stores personal information on a user registered to use the security authentication system 100 and the service system 50. The security authentication system 100 requests a registration procedure to the user when there is no information about a user requesting generation and authentication of the secure key. The user information input by the user is called in a log-in or an access of the user to perform user authentication.

FIG. 6 is a block view illustrating a combining method for generating a secure key.

The collected authentication elements are stored for each user and the combining unit 106 selectively extracts and combines the authentication elements stored for each user.

The secure key generated by the combining unit 106 is stored in a secure key DB 118.

The combining unit 106 generates the secure key to set the generated secure key to be used for a single use or to be used only within a predetermined period. The single-use secure key is immediately deleted or discarded after being used for security authentication. The period-limited secure key having a predetermined usable period is immediately deleted or discarded after the predetermined period. A duration of the secure key is defined by the user.

An encrypting unit 108 performs encryption of contents or information using the secure key generated by multiple cross-combination.

Personal information which may be combined and used when specifying an individual, such as identifiable information, a phone number, an address, an email address, and the like uses a block encryption algorithm capable of decryption. In addition, a safe encryption algorithm required for encrypting a resident registration number and account information uses a symmetric key encryption algorithm as a bi-directional encryption algorithm capable of data encryption and decryption. At this time, it is preferable to select and encrypt an algorithm which provides a security strength of 112 bits or more.

Typically, the encryption is performed by selecting one of SEED and ARIA-128/192/256 as demestic encryption algorithms provided from the Korea Internet and Security Agency.

A decrypting unit 110 performs decryption using the secure key generated by cross-combining multi-authentication elements. The decrypting unit 110 is set to use the same algorithm as the encryption algorithm used by the encrypting unit 108.

An authority managing unit 112 generates and manages authentication authority for each user using many secure keys generated by cross-combining multiple authentication elements. Also, the authority managing unit 112 develops collaborative document security algorithms for multi-users, and applies authority keys for reading, correction, deletion, etc. for a document together in the document generation to apply authority according to a key generated as an authentication element of the user accessing the document. The development of algorithms for tracking and storing document history changes leaves the history changes for the document as a record, and at this time, the generated record is encrypted to be accessible to only specific device, location, and environment to prevent any access.

As such, the security authentication system 100 may generate a secure key by cross-combining authentication elements of the multi-users and the generated secure key is provided to the user terminals 30 and 40 to be used for an access procedure for the service system 50.

The present invention may be used for a security authentication system and a security authentication method.

Hereinabove, the embodiments of the present invention have been described with the accompanying drawings, but it can be understood by those skilled in the art that the present invention can be executed in other detailed forms without changing the technical spirit or requisite features of the present invention. Therefore, the embodiments described as above are exemplary in all aspects and should be understood as not being restrictive and the scope of the present disclosure is represented by claims to be described below rather than the detailed description, and it is to be interpreted that the meaning and scope of the claims and all the changes or modified forms derived from the equivalents thereof come within the scope of the present invention.

The invention claimed is:

1. A security authentication system for generating a secure key by combining authentication elements of multi-users, as the security authentication system (100) which collects the authentication elements from a plurality of smart terminals by a request of a first user terminal (30) used by a user requesting a security authentication service to generate the secure key, the security authentication system comprising:
   a control unit (102) configured to control operations of configurations;
   a collecting unit (104) configured to automatically collect the authentication elements from the first user terminal (30) and a second user terminal (40) used by a user without requesting the security authentication service and store the collected authentication elements in an authentication element DB (116); and
   a combining unit (106) configured to generate the secure key by multiple cross-combination of the authentication elements collected from the first user terminal (30) and the second user terminal (40) to store the generated secure key in a secure key DB (118),
   wherein the secure key is used for authenticating whether the first user terminal (30) is a user having access authority to the service system (50) to be accessed, and
   the combining unit (106) randomly extracts and combines the plurality of authentication elements collected from the plurality of user terminals (30, 40) and generates the secure key using an encryption algorithm, and
   wherein the authentication elements include:
      area detection information including information on an RFID tag, a WIFI SSID, a beacon, and a sensor value;
      knowledge-based information including an email address, an ID, and a password of a user;
      device information including a sensor, a universal unique identifier (UUID), status information, an MAC address; and
      possession information including a phone number, an NFC tag, a QR code, and a barcode.

2. The security authentication system of claim 1, wherein the secure key is any one of a single-use secure key to be deleted or discarded after used for security authentication and a period-limited secure key to be deleted or discarded after a predetermined period.

3. A security authentication method for generating a secure key by combining authentication elements of multi-users, as the security authentication method using the security authentication system (100), the security authentication method comprising:
   a first step of requesting, by a user requesting a security authentication service, any one service of contents, information, financial services, and access authentication by accessing a service system (50) through a first user terminal (30) and requesting, by the first user terminal (30), the secure key for security authentication by accessing the security authentication system (100);
   a second step of requesting, by a collecting unit (104) included in the security authentication system (100), provision of the authentication elements to the first user terminal (30) and a second user terminal (40) used by a user without requesting the security authentication service;
   a third step of storing, by the collecting unit (104), a plurality of authentication elements provided from the first user terminal (30) and the second user terminal (40) in an authentication element DB (116);
   a fourth step of generating, by a combining unit (106) included in the security authentication system (100), the secure key by multi-dimensionally cross-combining the plurality of authentication elements and providing the generated secure key to the first user terminal (30);
   a fifth step of converting, by the first user terminal (30), the secure key provided from the combining unit (106) into a hash value to transmit the converted hash value to security authentication system (100); and
   a sixth step of notifying, by the security authentication system (100), to the service system (50) that the security authentication is normally processed, when the hash value transmitted from the first user terminal (30) is the same as a hash value of the secure key generated by the combining unit (106),
   wherein the authentication elements include:
      area detection information including information on an RFID tag, a WIFI SSID, a beacon, and a sensor value;
      knowledge-based information including an email address, an ID, and a password of a user;
      status information including a sensor, a universal unique identifier (UUID), status information, an MAC address; and
      possession information including a phone number, an NFC tag, a QR code, and a barcode.

4. The security authentication method of claim 3, wherein the secure key is any one of a single-use secure key to be deleted or discarded after used for the security authentication and a period-limited secure key to be deleted or discarded after a predetermined period.

5. A security authentication method for generating a secure key by combining authentication elements of multi-users, as the security authentication method using the security authentication system (100), the security authentication method comprising:
   a first step of requesting, by a user requesting a security authentication service, any one service of contents, information, financial services, and access authentication by accessing a service system (50) through a first user terminal (30) and requesting, by the first user terminal (30), the secure key for security authentication by accessing the security authentication system (100);
   a second step of requesting, by a collecting unit (104) included in the security authentication system (100), provision of the authentication elements to the first user terminal (30) and a second user terminal (40) used by a user without requesting the security authentication service;
   a third step of storing, by the collecting unit (104), a plurality of authentication elements provided from the first user terminal (30) and the second user terminal (40) in an authentication element DB (116);
   a fourth step of generating, by a combining unit (106) included in the security authentication system (100), the secure key by multi-dimensionally cross-combining the plurality of authentication elements and providing the generated secure key to the first user terminal (30);
   a fifth step of converting, by the first user terminal (30), the secure key provided from the combining unit (106) into a hash value to transmit the converted hash value to security authentication system (100); and
   a sixth step of notifying, by the security authentication system (100), to the service system (50) that the security authentication is normally processed, when the hash value transmitted from the first user terminal (30) is the same as a hash value of the secure key generated by the combining unit (106), and wherein the authentication elements include:
- area detection information including information on an RFID tag, a WIFI SSID, a beacon, and a sensor value;
- knowledge-based information including an email address, an ID, and a password of a user;
- device information including a sensor, a universal unique identifier (UUID), status information, an MAC address; and
- possession information including a phone number, an NFC tag, a QR code, and a barcode.

6. A security authentication method for generating a secure key by combining authentication elements of multi-users, as the security authentication method using the security authentication system (100), the security authentication method comprising:

a first step of requesting, by a user requesting a security authentication service, any one service of contents, information, financial services, and access authentication by accessing a service system (50) through a first user terminal (30) and requesting, by the first user terminal (30), the secure key for security authentication by accessing the security authentication system (100);

a second step of requesting, by a collecting unit (104) included in the security authentication system (100), provision of the authentication elements to the first user terminal (30) and a second user terminal (40) used by a user without requesting the security authentication service;

a third step of storing, by the collecting unit (104), a plurality of authentication elements provided from the first user terminal (30) and the second user terminal (40) in an authentication element DB (116);

a fourth step of generating, by a combining unit (106) included in the security authentication system (100), the secure key by multi-dimensionally cross-combining the plurality of authentication elements and providing the generated secure key to the first user terminal (30);

a fifth step of converting, by the first user terminal (30), the secure key provided from the combining unit (106) into a hash value to transmit the converted hash value to security authentication system (100); and a sixth step of notifying, by the security authentication system (100), to the service system (50) that the security authentication is normally processed, when the hash value transmitted from the first user terminal (30) is the same as a hash value of the secure key generated by the combining unit (106), wherein the authentication elements include:
- area detection information including information on an RFID tag, a WIFI SSID, a beacon, and a sensor value;
- knowledge-based information including an email address, an ID, and a password of a user;
- device information including a sensor, a universal unique identifier (UUID), status information, an MAC address; and
- possession information including a phone number, an NFC tag, a QR code, and a barcode, and wherein the secure key is any one of a single-use secure key to be deleted or discarded after used for security authentication and a period-limited secure key to be deleted or discarded after a predetermined period.

* * * * *